United States Patent
Dupuis

[15] 3,665,571
[45] May 30, 1972

[54] CUTTING INSERT HOLDER

[72] Inventor: Hubert J. Dupuis, Warren, Mich.

[73] Assignee: Carmet Company, Pittsburgh, Pa.

[22] Filed: Apr. 27, 1970

[21] Appl. No.: 31,913

[52] U.S. Cl. .................................................................29/96
[51] Int. Cl. ............................................................B26d 1/00
[58] Field of Search ..................29/95, 96, 97, 97.5, 98, 105, 29/105 A

[56] References Cited

UNITED STATES PATENTS

| | | | |
|---|---|---|---|
| 3,299,491 | 1/1967 | Hall | 29/96 |
| 3,466,720 | 9/1969 | Stier | 29/95 |
| 3,102,326 | 9/1963 | Conti et al. | 29/96 |
| 2,999,301 | 9/1961 | Conti et al. | 29/96 |
| 3,192,602 | 7/1965 | Copeland | 29/96 |
| 3,192,603 | 7/1965 | Greenleaf | 29/96 |
| 3,405,433 | 10/1968 | Williams | 29/105 |
| 3,289,274 | 12/1966 | Brucato | 29/97.5 |

*Primary Examiner*—Harrison L. Hinson
*Attorney*—Richard A. Speer, Vincent G. Gioia and Howard R. Berkenstock, Jr.

[57] ABSTRACT

Described herein is a combination of a cutting insert and holder therefore. The novel holder includes a shank and an indexing post connected to the shank which can receive an indexable insert and means, such as a cam, to secure an indexable insert, when positioned on the indexing post in cutting position.

1 Claim, 12 Drawing Figures

INVENTOR.
HUBERT J. DUPUIS
By Vincent D. Gioia
Attorney

INVENTOR.
HUBERT J. DUPUIS

CUTTING INSERT HOLDER

BACKGROUND OF THE INVENTION

This invention relates to a novel tool holder for a cutting insert and to a novel combination of insert and holder. The combination provides a practical device which is capable of holding a triangular insert in positions which can be used for tracing.

In the past the triangular insert has been very difficult to locate and hold in position for tracing without part of the holder interfering with the article to be traced. The present invention provides a simple yet highly effective tool holder for cutting inserts and is particularly useful with triangular inserts. In accordance with the invention there is provided a holder for cutting inserts which comprises a shank that may be secured in a tool holder assembly of conventional type. The shank is adapted to receive a cutting insert which is retained in contact with the shank on an indexing post connected to the shank. Some means, such as a cam, secures the insert in cutting position. In the preferred embodiment, the insert holder comprises a shank, an indexing post connected to to the shank, a supporting post also connected to the shank, and means, such as a cam, to urge an indexible insert positioned by the indexing post into contact with the supporting post so as to secure the insert in a cutting position.

Figure 1:
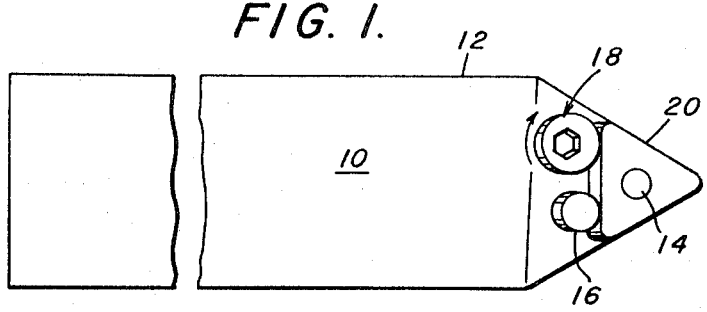
Figure 4:
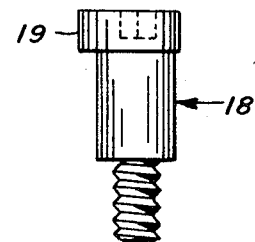
Figure 2:
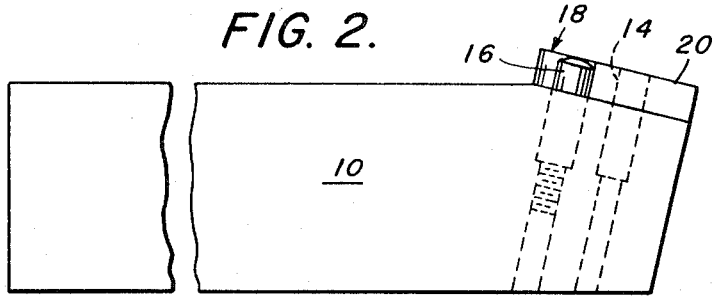
Figure 3:
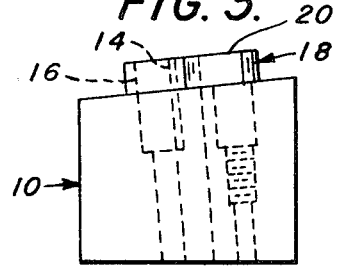
Figure 6:
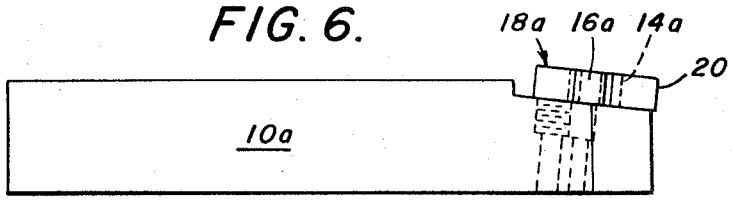
Figure 7:
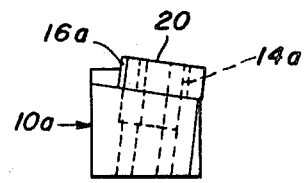
Figure 8:
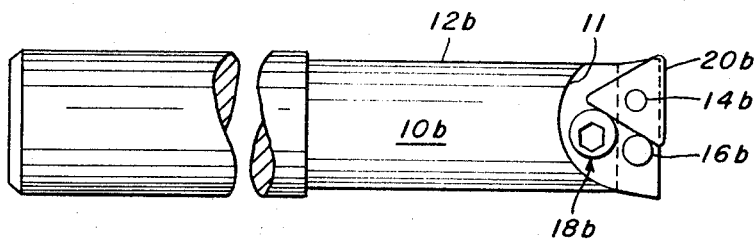
Figure 9:
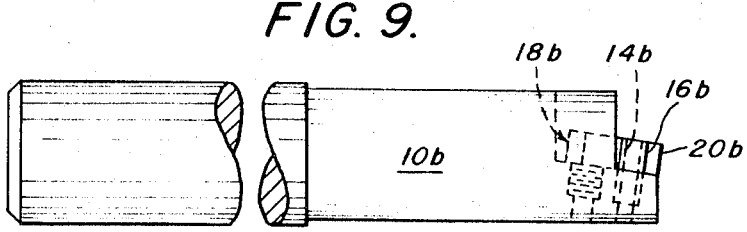
Figure 10:
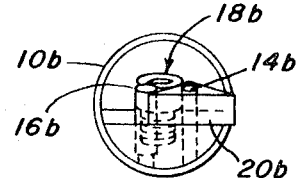
Figure 11:
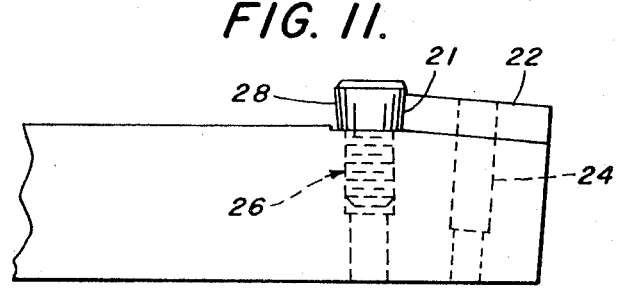
Figure 12:
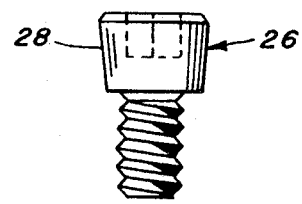

The accompanying drawings illustrate various embodiments of the invention and will aid in an understanding thereof:

FIGS. 1, 2, and 3 are top, front, and side elevation views, respectively, of a preferred embodiment of the tool holder and insert in accordance with the invention, FIG. 4 is a view of the cutting insert securing means in accordance with the preferred embodiment shown in FIGS. 1, 2, and 3, FIGS. 5, 6, and 7 are top, front, and side elevation views of a second embodiment of the invention, FIGS. 8, 9, and 10 are top, front, and side elevation views of a third embodiment of the invention, and FIGS. 11 and 12 illustrate an alternate method of securing the cutting insert in cutting position.

Referring to the drawings and to the embodiment illustrated in FIGS. 1, 2, and 3 there is described a tool holder 10 comprising a shank 12, an indexing post 14, a supporting post 16, and suitable means 18 to secure a cutting insert 20 in cutting position by bearing against one side of the insert causing it, in turn, to bear against the supporting post 16. In the preferred embodiment shown, means 18 comprises a threaded member having a cam head 19 which may be rotated into insert-locking position. By rotation in the opposite direction, the cam head releases the cutting insert permitting its removal from the holder.

Figure 5:
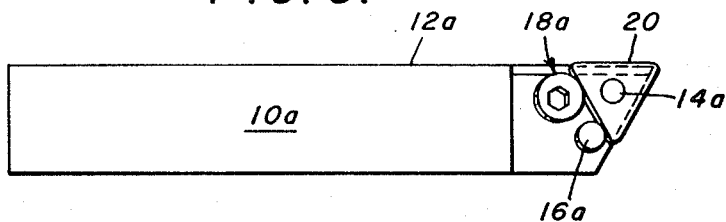

The embodiment shown in FIGS. 5, 6, and 7 illustrates that various shank configurations may be employed in accordance with the invention. Although a major advantage of the device in accordance with the invention is that it requires little or no milling of the shank to accommodate the insert, the embodiment in FIGS. 5, 6, and 7 depicts a stepped portion in the shank 10a in which insert 20a is positioned on indexing post 14a but locked in position by means 18a causing the insert to bear against supporting post 16a.

In a similar fashion the embodiment shown in FIGS. 8, 9, and 10 demonstrate still other shank configurations which may be used in accordance with the invention to support and secure a cutting insert in cutting position. In the embodiment in these figures shank 10b is of circular cross section. A rounded insert-supporting-portion of the shank is shown at 11. However, insert 20b is supported on indexing post 14b by cam member 18b causing the insert to bear against supporting post 16b.

For some applications it may be sufficient to secure the cutting insert in cutting position without the need for a separate supporting post. The embodiment shown in FIGS. 11 and 12 illustrates one such arrangement. In this case an insert 22 is supported on an indexing post 24 as in previous embodiments. However, the securing means comprises a threaded member 26 having tapered surfaces 28. The insert 22 to be used in this embodiment has a tapered side 21 which conforms in configuration to the tapered surface 28 but is inverted with respect thereto. As the threaded member 26 is fastened in the shank, the tapered surface 28 of the member 26 bears against the tapered side 21 of the insert 22, causing it to be secured in position by bearing against the indexing post 24.

It is apparent from the foregoing, that various changes and modifications may be made without departing from the invention. Thus, for example, both reversible and non-reversible inserts may be used and, although the holder of the invention is particularly useful in solving the problem of supporting triangularly shaped inserts, other polygonal inserts may be conveniently supported by a holder as disclosed herein. Accordingly, the scope of the invention should be limited only by the appended claims wherein what is claimed is:

I claim:

1. A combination of a cutting insert and holder therefore which comprises a shank adapted to receive said cutting insert and to be retained in a tool holder assembly, an indexing post connected to said shank, an insert supporting post also connected to said shank, an indexable insert having an aperture therethrough positioned in seating engagement with said indexing post and on said shank, said indexing post and supporting post being spaced apart so as to accommodate said insert, means comprising a rotatable cam member connected to said shank adapted to urge said insert against said supporting post and maintain said insert in secure cutting position.

* * * * *